United States Patent
Ruef

(10) Patent No.: US 10,366,014 B1
(45) Date of Patent: Jul. 30, 2019

(54) FAST SNAP COPY

(71) Applicant: EMC IP HOLDING COMPANY LLC, Hopkinton, MA (US)

(72) Inventor: Richard Ruef, Santa Cruz, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 68 days.

(21) Appl. No.: 15/492,184

(22) Filed: Apr. 20, 2017

(51) Int. Cl.
  *G06F 3/06* (2006.01)
  *G06F 12/121* (2016.01)
  *G06F 12/0804* (2016.01)

(52) U.S. Cl.
  CPC ............ *G06F 12/121* (2013.01); *G06F 3/065* (2013.01); *G06F 3/0619* (2013.01); *G06F 3/0685* (2013.01); *G06F 12/0804* (2013.01); *G06F 2212/1032* (2013.01); *G06F 2212/60* (2013.01); *G06F 2212/69* (2013.01)

(58) Field of Classification Search
  CPC ...... G06F 3/0619; G06F 3/065; G06F 3/0685; G06F 12/0804; G06G 12/121
  USPC ......................................................... 711/135
  See application file for complete search history.

(56) References Cited

U.S. PATENT DOCUMENTS

| | | | | |
|---|---|---|---|---|
| 7,493,458 B1* | 2/2009 | Kemeny | ............... | G06F 3/0611 |
| | | | | 711/161 |
| 9,075,754 B1* | 7/2015 | Sadhu | ............... | G06F 11/1458 |
| 9,317,375 B1* | 4/2016 | Sadhu | ............... | G06F 11/1451 |
| 9,606,929 B2* | 3/2017 | Brosnan | ............... | G06F 12/0871 |
| 9,836,244 B2* | 12/2017 | Bates | ............... | G06F 11/1435 |
| 2014/0245026 A1* | 8/2014 | Bates | ............... | G06F 11/1435 |
| | | | | 713/190 |

* cited by examiner

*Primary Examiner* — Pierre Miche Bataille
(74) *Attorney, Agent, or Firm* — Anderson Gorecki LLP

(57) ABSTRACT

A fast snap is a consistent point-in-time copy or logical copy of a storage object that can be created more quickly than an ordinary snap. In order to generate a fast snap a storage array creates a copy or logical copy of all of the dirty data associated with a source device by copying or logically copying dirty pages cache into a separate record in volatile memory, instantiates an unpopulated snap device that is backed by persistent storage, and generates a mapping between the record and the unpopulated snap device. The mapping includes the information needed to populate the unpopulated snap device with the dirty pages from the record. Once the fast snap has been created it is possible to service IOs to the source device and the fast snap device because the data can be accessed from the record and the cache.

19 Claims, 4 Drawing Sheets

FAST SNAP COPY

BACKGROUND

The subject matter of this disclosure is generally related to computer networks in which a data storage system maintains data for multiple host servers and concurrent users. Host servers run data processing applications that may be referred to as host applications. Host application data may be maintained on tangible persistent data storage drives that are managed by storage arrays. The storage arrays may present logical storage devices to the host servers for storage of host application data. The logical storage devices are backed by the managed drives. The host servers may access the host application data by sending IOs with reference to the logical storage devices. The storage arrays implement the IOs by accessing the managed storage drives based on metadata that provides a mapping between the logical storage devices and the managed drives. The storage arrays may provide a variety of data storage services including replication of the logical storage devices.

SUMMARY

All examples, aspects and features mentioned in this document can be combined in any technically possible way.

In accordance with an aspect, an apparatus comprises: a storage array comprising: a plurality of interconnected computing nodes, each of the computing nodes comprising at least one processor and non-transitory volatile memory; a plurality of groups of non-volatile data storage drives, each group of data storage drives connected with one of the computing nodes; a source device comprising contiguous logical block addresses that map to non-contiguous addresses of the data storage drives; and fast snap generation instructions stored on the memory that comprise: instructions that create a record in the memory of dirty data associated with the source device; instructions that instantiate an unpopulated snap device; and instructions that generate a mapping between the record and the unpopulated snap device. Some implementations comprise instructions that destage the dirty data from the record to the unpopulated snap device by flushing the dirty data to the data storage drives. In some implementations the record is created by logically copying the dirty data from a cache associated with the memory, and the apparatus comprises instructions that destage the dirty data from the cache to the source device by flushing the dirty data to the data storage drives. In some implementations the dirty data comprises dirty pages. Some implementations comprise instructions that service IOs directed to the unpopulated snap device by accessing the record. In some implementations the record is created by logically copying the dirty data from a cache associated with the memory, and the apparatus comprises instructions that service IOs directed to the source device by accessing the cache. In some implementations the source device comprises a production device.

In accordance with an aspect a method comprises: generating a fast snap in a storage array by: creating a record in volatile memory comprising dirty data associated with a source device in non-volatile data storage drives; instantiating an unpopulated snap device; and generating a mapping between the record and the unpopulated snap device. Some implementations comprise destaging the dirty data from the record to the unpopulated snap device by flushing the dirty data to the data storage drives. Some implementations comprise creating the record by logically copying the dirty data from a cache associated with the memory. Some implementations comprise destaging the dirty data from the cache to the source device by flushing the dirty data to the data storage drives. In some implementations creating the record of dirty data comprises creating a record of dirty pages. Some implementations comprise servicing IOs directed to the unpopulated snap device by accessing the record. Some implementations comprise creating the record by logically copying the dirty data from a cache associated with the memory. Some implementations comprise servicing IOs directed to the source device by accessing the cache.

In accordance with an aspect a non-transitory computer-readable media comprises: instructions that generate a fast snap, comprising: instructions that create a record in volatile memory comprising a logical copy of dirty data associated with a source device in non-volatile data storage drives; instructions that instantiate an unpopulated snap device; and instructions that generate a mapping between the record and the unpopulated snap device. Some implementations comprise instructions that destage the dirty data from the record to the unpopulated snap device by flushing the dirty data to non-volatile data storage drives. In some implementations the record is created by logically copying the dirty data from a cache associated with the memory, and the non-transitory computer-readable media comprises instructions that destage the dirty data from the cache to the source device by flushing the dirty data to the data storage drives. Some implementations comprise instructions that service IOs directed to the unpopulated snap device by accessing the record.

Other aspects, features and implementations may become apparent in view of the detailed description and figures.

DETAILED DESCRIPTION

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor hardware components. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible non-transitory features. For example, a virtual storage device could be based on multiple physical storage drives. The term "logic" is used to refer to special purpose physical circuit elements and software instructions that are stored on a non-transitory computer-readable medium and implemented by general-purpose tangible processors.

Figure 1:
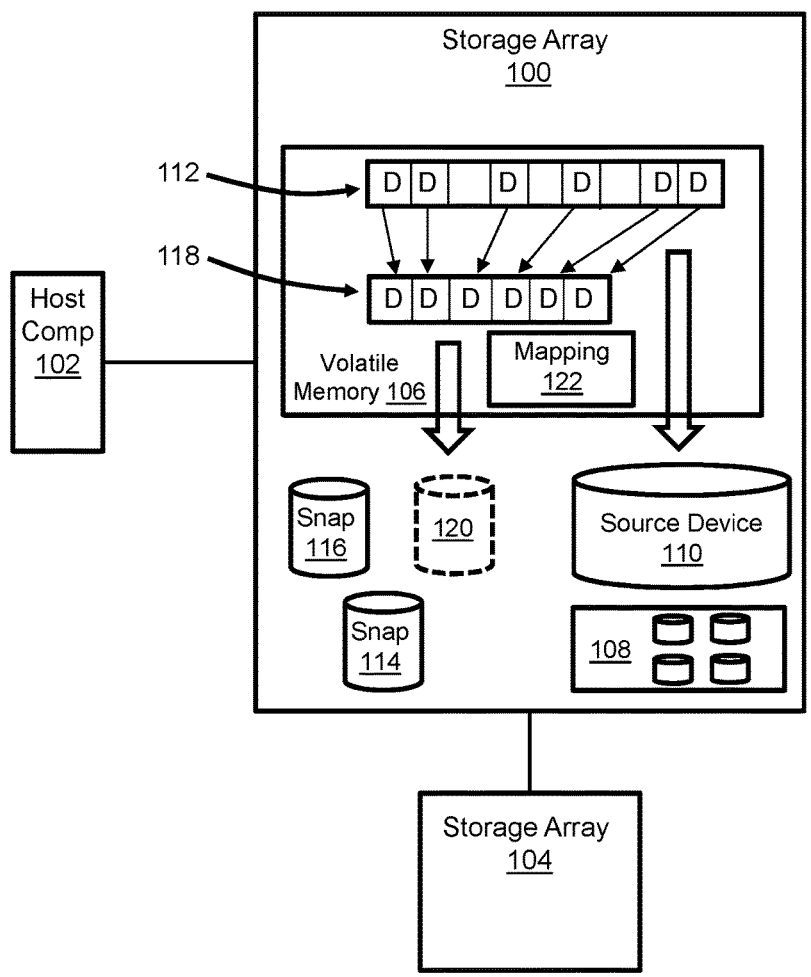
FIG. 1 illustrates a storage system that implements fast snaps.

FIG. 1 illustrates a data storage system that implements fast snaps. A storage array 100 is connected with either or both of a host computer 102 and another storage array 104 for which the storage array 100 provides data storage services such as replication. The storage array 100 manages a volatile memory 106 and persistent (non-volatile) storage 108. A source device 110 is a logical volume of storage that represents and is backed by some or all of the resources of the persistent storage 108. Data may be copied into a cache 112 portion of volatile memory 106 in order to support IOs (input-output operations such as reads and writes). In some implementations the storage array 100 may maintain the source device 110 as a production device for host application data, where the host application that uses the host application data runs on the host computer 102. In some implementations the source device 110 could be a virtualized storage device or a backup copy maintained for storage array 104. A wide variety of other implementations are also possible. As will be explained in greater detail below, the storage array 100 generates fast snaps of the source device 110, and the fast snaps become ordinary snaps with further processing.

A snap is a consistent point-in-time persistent storage copy of a storage object such as source device 110. Multiple snaps may be generated over time, and each snap may be an incremental copy that only represents changes to the source device since some prior point in time, e.g. and without limitation since creation of the previous snap. For example, a first snap 114 could be created at time t=0 and a second snap 116 could be created at time t=1, where the second snap represents only the changes since the first snap was created. A snap that is a complete copy of the source device at some point in time may be referred to as a clone. Clones may be created to provide prior point in time versions of the source device where the source device is updated with each change. A wide variety of different types of snaps may be implemented, and the term snap is used herein to refer to both incremental and complete copies.

A previously known technique for creating snaps is to force flush all dirty data D from the storage array cache 112 to the non-volatile storage 108. The dirty data in the cache 112 represents changes to the source device 110 that are not present in persistent storage, e.g. as a result of writes. Although the force flushing technique achieves consistent snap content, the process of force flushing all of the dirty data to persistent storage can take considerable time to complete. This can be problematic because while the dirty data is being flushed neither the snap nor the source device is available for IOs. Thus it may be impractical or impossible to satisfy performance requirements in highly active storage arrays with many gigabytes of dirty data to be flushed because it may take many seconds to move the data to persistent storage before the snap can be considered complete and IOs resumed.

A fast snap is a consistent point-in-time copy of a storage object such as source device 110 that can be created more quickly than an ordinary snap. In order to generate a fast snap the storage array 100 creates a copy or a logical copy of all of the dirty data associated with the source device 110. This may be accomplished by copying or logically copying the dirty data D from the cache 112 into a separate record 118 in volatile memory 106. The record 118 is not necessarily the same size as the corresponding cache 112 because not all of the data in the cache 112 is necessarily dirty. An unpopulated snap device 120 that is backed by persistent storage 108 is instantiated. Metadata that provides a mapping 122 between the record 118 and the unpopulated snap device 120 is generated. The mapping 122 includes the information needed to populate the unpopulated snap device 120 with the dirty data D from the record 118. Generation of the fast snap is then considered complete. In other words, the fast snap may consist of or include the record 118 of the dirty data D, the unpopulated snap device 120, and the metadata mapping 122. Snap generation can be considered complete in terms of accessibility once the fast snap has been created because IOs to the source device and fast snap can be processed. For example, the fast snap data can be accessed from the record 112 and the source device data can be accessed from cache 112.

An ordinary snap is generated from the fast snap over time as resources allow. The dirty pages D in the record 118 are destaged to the unpopulated snap device 120, and thus to persistent storage 108, in accordance with the mapping 122. Once the unpopulated snap device 120 is populated with the dirty data, i.e. all dirty data D is flushed to persistent storage 108, the previously unpopulated fast snap device 120 becomes an ordinary snap. More particularly, unpopulated snap device 120 becomes an ordinary snap device such as snaps 114, 116. Once the dirty pages D in the record 118 are destaged to persistent storage the record and the mapping are no longer needed so the corresponding addresses in volatile memory 106 can be freed. The dirty pages D in cache 112 are destaged to the source device 110, and thus to persistent storage 105, over time as resources are available. Once the dirty pages D in cache 112 are destaged to the source device 110, and thus to persistent storage 105, the cache 112 can be freed.

Figure 2:
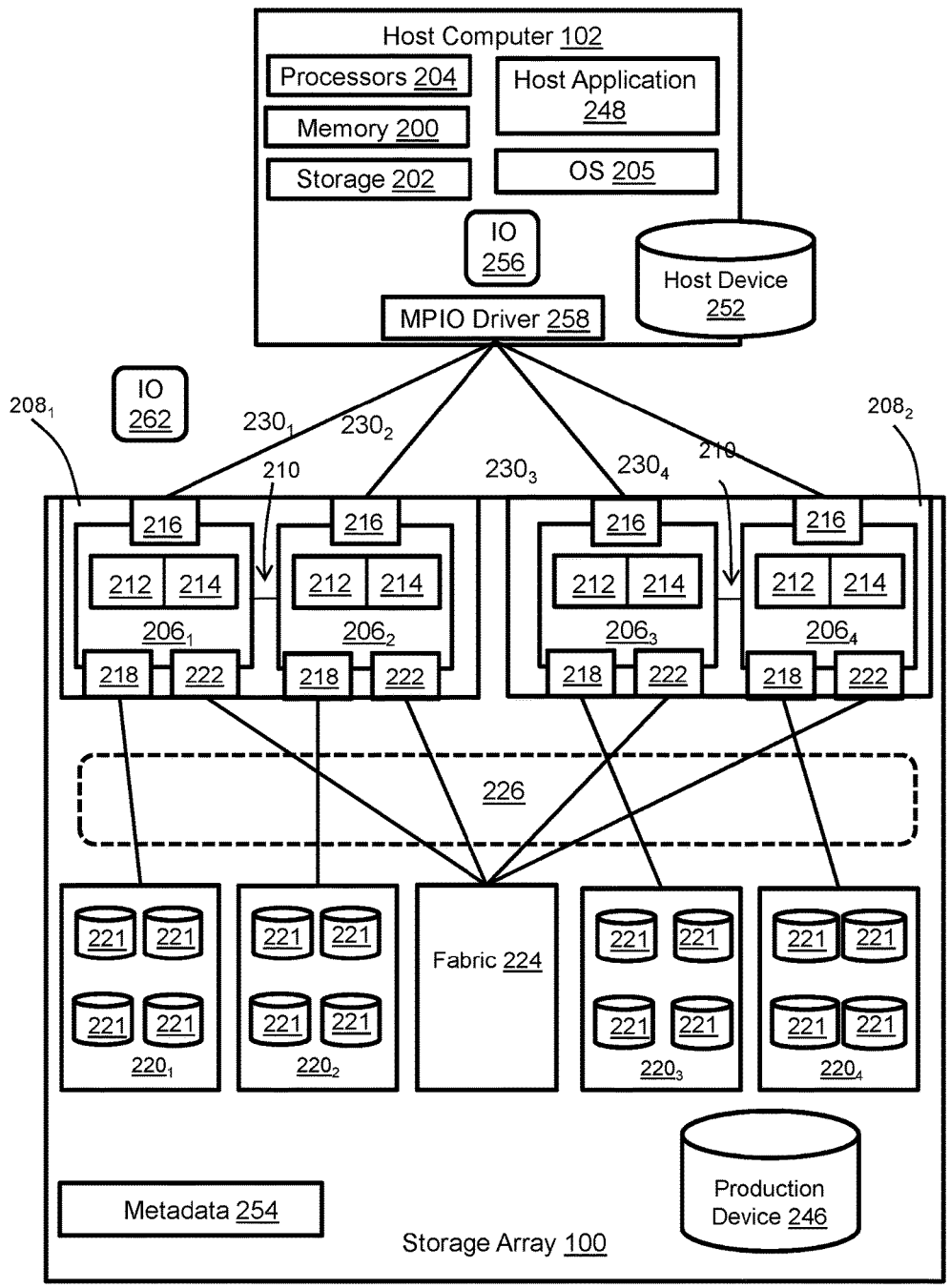
FIG. 2 illustrates the host computer and storage array of FIG. 1 in greater detail.

FIG. 2 illustrates the host computer 102 and storage array 100 of FIG. 1 in greater detail. The host computer 102 may be a "vanilla" server computer with volatile memory 200, persistent storage 202, one or more tangible processors 204, and an OS (operating system) 205 or hypervisor. The host computer 102 might support virtual hosts running on virtual machines or containers, and although an external host computer is illustrated, internal hosts may be instantiated within the storage array.

The architecture and components of the storage array 100 may include "vanilla" storage servers or specially designed hardware for providing data storage services. In the illustrated example the storage array 100 includes a plurality of computing nodes $206_1$-$206_4$ such as storage directors, for example and without limitation. Pairs of the computing nodes, e.g. ($206_1$, $206_2$) and ($206_3$, $206_4$), may be organized as storage engines $208_1$, $208_2$, respectively, for purposes of failover between computing nodes. The paired computing nodes of each storage engine may be directly interconnected by communication links 210. Each computing node includes at least one tangible multi-core processor 212 and a local volatile memory 214. The local volatile memory 214 may include, for example and without limitation, components such as RAM (random access memory). Each computing node may include one or more FEs 216 (front-end directors, a.k.a. front end adapters) for communicating with the host computer 102. Each computing node $206_1$-$206_4$ may also include one or more BEs 218 (back end directors, a.k.a. back end adapters) for communicating with respective associated back end storage bays $220_1$-$220_4$, thereby enabling access to managed drives 221. The managed drives 221 may include tangible persistent storage components of one or more technology types, for example and without limitation SSDs such as flash, and HDDs (hard disk drives) such as SATA (Serial Advanced Technology Attachment) and FC (Fibre Channel). The managed drives 221 may provide the persistent storage 108 (FIG. 1) for fast snap generation. Each computing node may also include one or more CAs (channel directors, a.k.a. channel adapters) 222 for communicating with other computing nodes via an interconnecting fabric 224. Each computing node may allocate a portion or partition of its respective local volatile memory 214 to a virtual shared "global" memory 226 that can be accessed by other computing nodes, e.g. via DMA (direct memory access) or RDMA (remote direct memory access). The shared global memory may provide the volatile memory 106 (FIG. 1) for fast snap generation.

The storage array 100 maintains data for a host application 248 running on the host computer 102. The host application uses storage services that are provided by the storage array. For example, the host application may write host application data to the storage array and read host application data from the storage array in order to perform various functions. Examples of host applications may include but are not limited to file servers, email servers, block servers and databases. A production device 246 and a host device 252 are created to enable the storage array to provide storage services to the host application. Without limitation, the production device 246 may be referred to as a production device, production volume, production LUN or host LUN, where LUN (Logical Unit Number) is a number used to identify the logical storage volume in accordance with the SCSI (Small Computer System Interface) protocol. The production device 246 may be the snapped source device 110 (FIG. 1). The host device 252 is a representation of the production device 246. The host device 252 and the production device 246 represent abstraction layers between the managed drives 221 and the host application 248. From the perspective of the host application 248, the host device 252 is a single data storage device having a set of contiguous fixed-size LBAs (logical block addresses) on which data used by the host applications resides. However, the data used by the host applications may actually be maintained by the computing nodes $206_1$-$206_4$ at non-contiguous addresses on various different managed drives 221. Moreover, there may be multiple host computers with host devices that represent the production device.

In order to service IOs from the host application 248, the storage array 100 maintains metadata 254 that indicates, among various things, mappings between production device 246 storage space and the locations of extents of host application data on the managed drives 221. The metadata 254 may include the mapping 122 (FIG. 1) for fast snap generation. In response to an IO 256 from the host application 248 to host device 252, an MPIO (Multi-Path Input-Output) driver 258 may determine whether the IO can be serviced by accessing the host computer memory 200. If that is not possible then the MPIO driver generates IO 262 with reference to production device 246 and selects a path on which to send the IO 262 to the storage array 100. There are multiple paths $230_1$-$230_4$ between the host computer 102 and the storage array 100, e.g. one path per FE 216. Each path may have a locally unique address that is known to the MPIO driver 258. However, the host application is not aware of the paths and addresses because it views the host device 252 as being available via a single logical path. The paths may be selected by the MPIO driver based on a wide variety of techniques and algorithms including, for context and without limitation, performance and load balancing. In the case of a read IO 262 the storage array uses the metadata 254 to locate the requested data, e.g. in the shared global memory 226 or managed drives 221. If the requested data is not in the shared global memory then it is temporarily copied into the shared global memory, e.g. creating cache 112 (FIG. 1), from the managed drives and sent to the host application via one of the computing nodes. In the case of a write IO 262 the storage array marks the data as dirty and creates new metadata that maps the production device address with a location to which the data is written on the managed drives. The shared global memory 226 may enable the production device to be reachable via all of the computing nodes and paths, although the storage array can be configured to limit use of certain paths to certain production devices.

Figure 3:
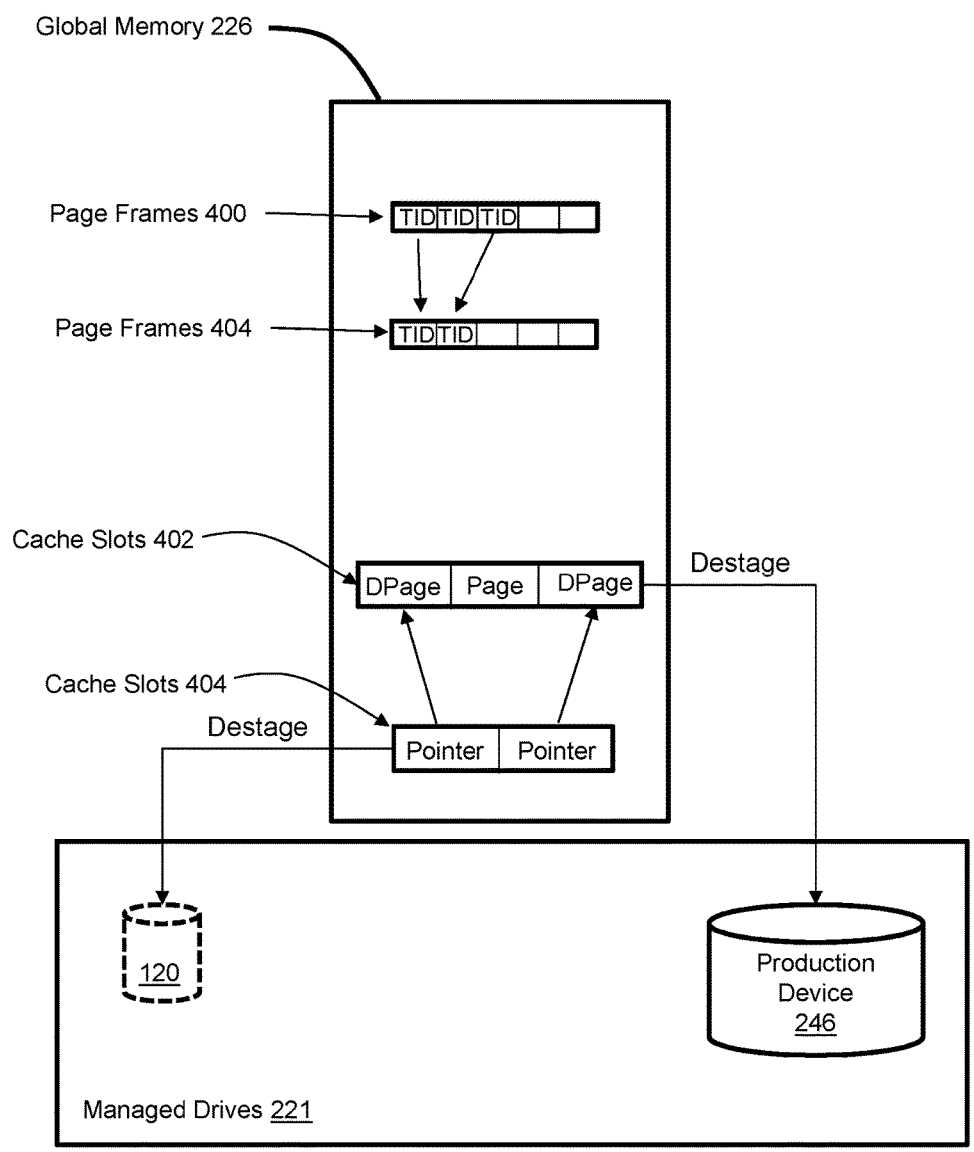
FIG. 3 illustrates the global memory of FIG. 2 in greater detail.

FIG. 3 illustrates the global memory 226 of FIG. 2 in greater detail. The metadata 254 (FIG. 2) may include TIDs (track ID tables) in global memory 226. The TIDs are maintained in fixed-size page frames, e.g. and without limitation 4 KB, where each page frame holds multiple TIDs. The TIDs include pointers to production device data in the cache slots and managed drives. For example, page frames 400 include TIDs with pointers to cache slots 402. Cache slots 402 include pages of production device 246 data. The cache slots 402 include some dirty pages (DPages) and some clean pages (Pages). When a fast snap is generated the dirty pages in cache slots 402 are copied or logically copied to cache slots 404 to create the record 118 (FIG. 1). A logical copy may be created by generating pointers (Pointers in cache slots 404) to the dirty pages in cache slots 402, although a variety of implementations with pointers are possible. The TIDs corresponding to those dirty pages are copied or logically copied from page frames 400 to page frames 404, thereby creating the mapping 122 (FIG. 1). The dirty pages in cache slots 404 are destaged to unpopulated snap device 120, and thus to the managed drives 221. The dirty pages in cache slots 402 are destaged to production device 246, and thus to the managed drives 221.

Figure 4:
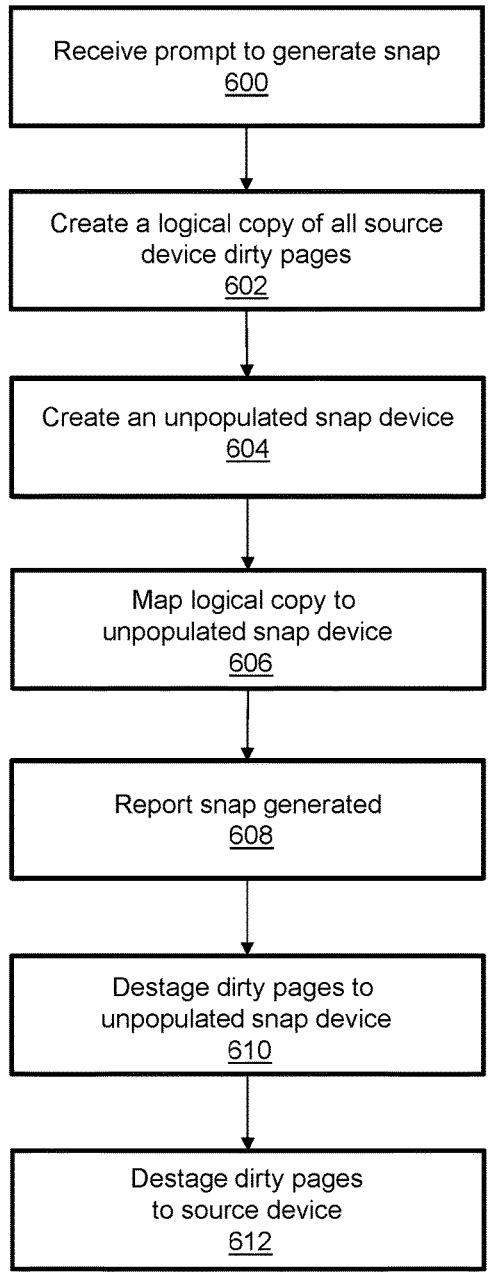
FIG. 4 illustrates a fast snap generation technique.

FIG. 4 illustrates a fast snap generation technique. Fast snap generation may commence in response to receipt of a prompt to generate a snap as indicated in block 600. A copy or logical copy of all source device dirty pages is created as indicated in block 602. An unpopulated snap device is instantiated as indicated in block 604. A mapping between the copy or logical copy of the dirty pages and the unpopulated snap device is generated as indicated in block 606. The procedures associated with blocks 602 through 606 may occur in any order and in parallel. The snap is then reported as generated as indicated in block 608. The dirty pages are destaged from the copy or logical copy to the unpopulated snap device and thus to persistent storage as indicated in block 610. The dirty pages are destaged from the original data or copied or logically copied cache to the source device and thus persistent storage as indicated in block 612. The procedures associated with blocks 610 and 612 may occur in any order and in parallel.

Specific examples have been presented in order to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
   generating a snap in a storage array by:
   creating a separate record in volatile memory of dirty data in volatile memory associated with a source device in non-volatile data storage drives;
   instantiating an unpopulated snap device;
   generating a mapping between the record and the unpopulated snap device;
   reporting a snap as generated on the snap device after generating the mapping; and
   destaging the dirty data to the snap device and the source device after reporting the snap as generated on the snap device.

2. The method of claim 1 comprising destaging the dirty data from the record to the unpopulated snap device by flushing the dirty data to the data storage drives.

3. The method of claim 2 comprising creating the record by logically copying the dirty data from a cache associated with the memory.

4. The method of claim 3 comprising destaging the dirty data from the cache to the source device by flushing the dirty data to the data storage drives.

5. The method of claim 1 wherein creating the record of dirty data comprises creating a record of dirty pages.

6. The method of claim 1 comprising servicing IOs directed to the unpopulated snap device by accessing the record.

7. The method of claim 1 comprising creating the record by logically copying the dirty data from a cache associated with the memory.

8. The method of claim 7 comprising servicing IOs directed to the source device by accessing the cache.

9. An apparatus comprising:
   a storage array comprising:
   a plurality of interconnected computing nodes, each of the computing nodes comprising at least one processor and non-transitory volatile memory in which dirty data is maintained until destaged;
   a plurality of groups of non-volatile data storage drives, each group of data storage drives connected with one of the computing nodes;
   a source device comprising contiguous logical block addresses that map to non-contiguous addresses of the data storage drives; and
   fast snap generation instructions stored on the memory that comprise:
   instructions that create a separate record in the memory of the dirty data associated with the source device;
   instructions that instantiate an unpopulated snap device;
   instructions that generate a mapping between the record and the unpopulated snap device;
   instructions that report a snap as generated on the snap device after the mapping is generated; and
   instructions that destage the dirty data to the snap device and the source device after the snap is reported as generated on the snap device.

10. The apparatus of claim 9 comprising instructions that destage the dirty data from the record to the unpopulated snap device by flushing the dirty data to the data storage drives.

11. The apparatus of claim 10 wherein the record is created by logically copying the dirty data from a cache associated with the memory, and comprising instructions that destage the dirty data from the cache to the source device by flushing the dirty data to the data storage drives.

12. The apparatus of claim 11 wherein the dirty data comprises dirty pages.

13. The apparatus of claim 9 comprising instructions that service IOs directed to the unpopulated snap device by accessing the record.

14. The apparatus of claim 9 wherein the record is created by logically copying the dirty data from a cache associated with the memory, and comprising instructions that service IOs directed to the source device by accessing the cache.

15. The apparatus of claim 9 wherein the source device comprises a production device.

16. A non-transitory computer-readable media comprising:
    instructions that generate a snap, comprising:
    instructions that create a separate record in volatile memory comprising a logical copy of dirty data in the volatile memory associated with a source device in non-volatile data storage drives;
    instructions that instantiate an unpopulated snap device;
    instructions that generate a mapping between the record and the unpopulated snap device
    instructions that report a snap as generated on the snap device after the mapping is generated; and
    instructions that destage the dirty data to the snap device and the source device after the snap is reported as generated on the snap device.

17. The non-transitory computer-readable media of claim 16 comprising instructions that destage the dirty data from the record to the unpopulated snap device by flushing the dirty data to non-volatile data storage drives.

18. The non-transitory computer-readable media of claim 17 wherein the record is created by logically copying the dirty data from a cache associated with the memory, and comprising instructions that destage the dirty data from the cache to the source device by flushing the dirty data to the data storage drives.

19. The non-transitory computer-readable media of claim 18 comprising instructions that service IOs directed to the unpopulated snap device by accessing the record.

* * * * *